United States Patent
Wuerr et al.

(10) Patent No.: US 12,007,739 B2
(45) Date of Patent: Jun. 11, 2024

(54) METHOD AND SYSTEM FOR EXECUTING AN EVENT-ORIENTED CONTROL PROGRAM

(71) Applicant: Schneider Electric Industries SAS, Rueil-Malmaison (FR)

(72) Inventors: Marcus Wuerr, Erlenbach (DE); Sebastian Diehm, Wertheim (DE)

(73) Assignee: Schneider Electric Industries SAS, Rueil-Malmaison (FR)

( * ) Notice: Subject to any disclaimer, the term of this patent is extended or adjusted under 35 U.S.C. 154(b) by 143 days.

(21) Appl. No.: 17/643,618

(22) Filed: Dec. 10, 2021

(65) Prior Publication Data
US 2022/0187779 A1    Jun. 16, 2022

(30) Foreign Application Priority Data

Dec. 10, 2020   (EP) ..................................... 20306536

(51) Int. Cl.
*G05B 19/05*     (2006.01)

(52) U.S. Cl.
CPC ...... *G05B 19/05* (2013.01); *G05B 2219/1144* (2013.01)

(58) Field of Classification Search
CPC .................. G05B 19/05; G05B 2219/1144
USPC .......................................................... 700/23
See application file for complete search history.

(56) References Cited

U.S. PATENT DOCUMENTS

| 6,260,058 B1 | 7/2001 | Hoenninger et al. |
| 2011/0125900 A1* | 5/2011 | Janssen ................ G05B 19/056 709/225 |
| 2013/0006398 A1* | 1/2013 | Mossner ............ G05B 19/0426 700/86 |
| 2014/0316578 A1* | 10/2014 | Grosch ................. G06F 9/4893 700/275 |

(Continued)

FOREIGN PATENT DOCUMENTS

| CN | 109542069 A | 3/2019 |
| CN | 112948097 A | 6/2021 |

(Continued)

OTHER PUBLICATIONS

Extended European Search Report dated May 14, 2021 in European Patent Application No. 20306536.2, 9 pages.

(Continued)

*Primary Examiner* — Jigneshkumar C Patel
(74) *Attorney, Agent, or Firm* — Oblon, McClelland, Maier & Neustadt, L.L.P.

(57) ABSTRACT

A method is set forth that serves to execute an event-oriented control program on a programmable logic controller of an automation system, wherein the control program comprises a plurality of functional modules, wherein an execution of the individual functional modules is triggered in an event-controlled manner on the occurrence of activation events that are each associated with the individual functional modules, and wherein priorities are assigned to each of the activation events. The method comprises the following steps:

Figure 1:
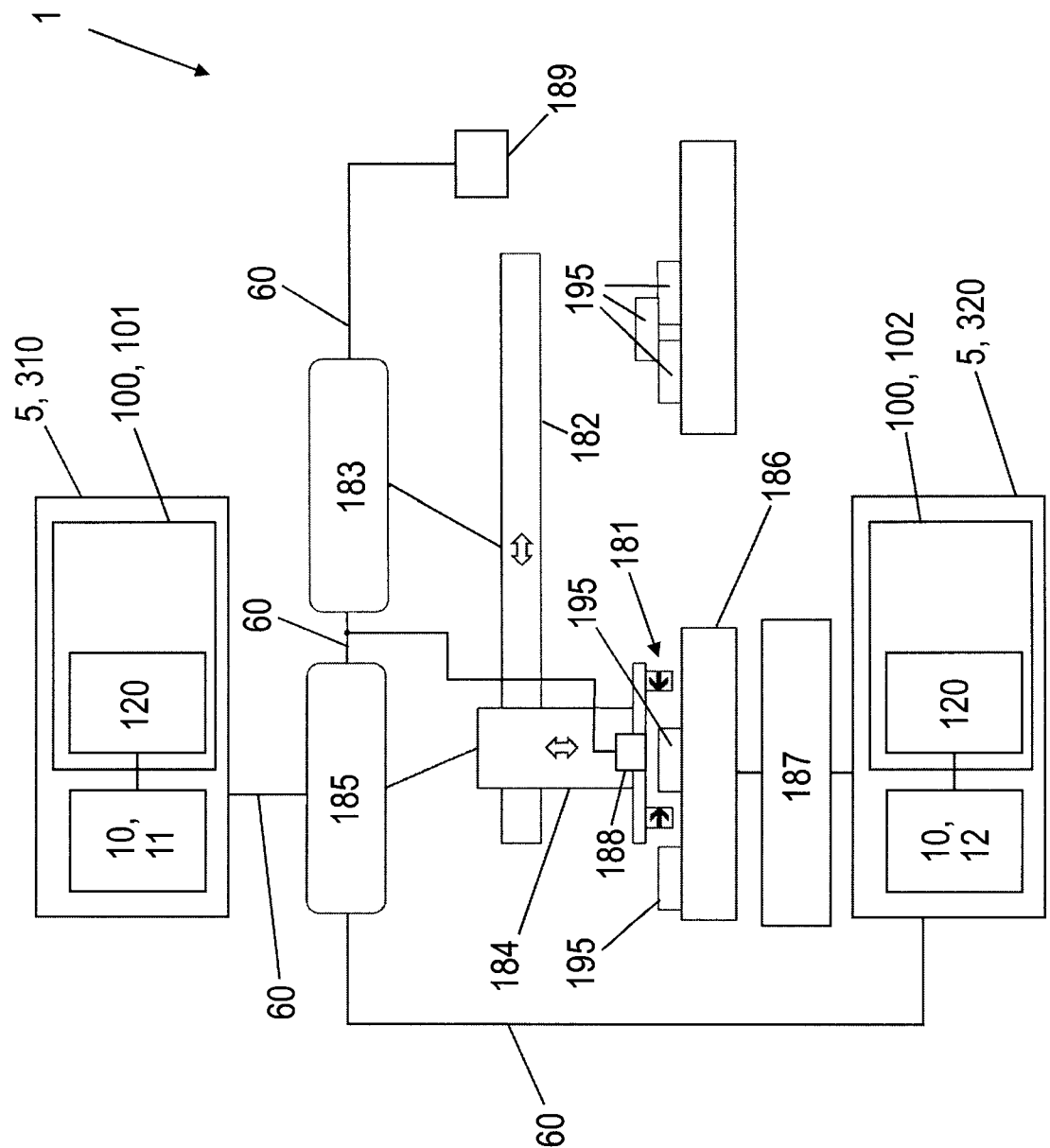

detecting activation events that have occurred; and
 executing the functional modules that are each associated with the activation events that have occurred in an (Continued)

execution sequence defined on the basis of the priorities of the individual activation events.

23 Claims, 9 Drawing Sheets

(56) References Cited

U.S. PATENT DOCUMENTS

2016/0147579 A1* 5/2016 Decker .................. G06F 9/542 718/102

FOREIGN PATENT DOCUMENTS

| CN | 114625064 A | | 6/2022 | |
|---|---|---|---|---|
| EP | 2 541 348 A1 | | 1/2013 | |
| EP | 2 728 475 A1 | | 5/2014 | |
| EP | 2 778 915 A1 | | 9/2014 | |
| EP | 2 899 633 A1 | | 7/2015 | |
| EP | 2899633 A1 | * | 7/2015 | ........... G05B 19/056 |
| WO | WO 2018/087314 A1 | | 5/2018 | |

OTHER PUBLICATIONS

Christensen, J. H. et al., "The IEC 61499 Function Block Standard: Overview of the Second Edition", ISA Automation Week 2012, 2012, 12 total pages.

Smodic, R., et al., "A Real-Time Execution Model for IEC 61499 Based Control Applications", INCOM'2006: 12$^{th}$ IFAC/IFIP/IFORS/IEEE/IMS Symposium Information Control Problems in Manufacturing, May 17-19, 2006, pp. 541-546.

Strasser, T., et al., "Design and Execution Issues in IEC 61499 Distributed Automation and Control Systems", IEEE Transactions on Systems, Man and Cybernetics—Part C: Applications and Reviews, 2010, pp. 1-10.

Doukas, G.S., et al., "A Real-Time Linux Execution Environment for Function-Block Based Distributed Control Applications", 3$^{rd}$ IEEE Int., Conference on Industrial Informatics (INDIN), Aug. 10-12, 2005, pp. 1-7.

Dai, Wenbin et al.: "Time-Stamped Event based Execution Semantics for Industrial Cyber-Physical Systems", 2015 IEEE 13th International Conference on Industrial Informatics (INDIN), Jul. 2015, 6 pages.

Sünder, C., et al., "Usability and Interoperability of IEC 61499 based distributed automation systems", IEEE Xplore, Sep. 2006, 7 pages.

Wikipedia Community, "Preemption (computing)," Wikipedia, Retrieved from the Internet [URL: https://web.archive.org/web/20220406164141/https://en.wikipedia.org/wiki/Preemption_(computing)], XP093003334, Apr. 6, 2022, 3 pages.

* cited by examiner

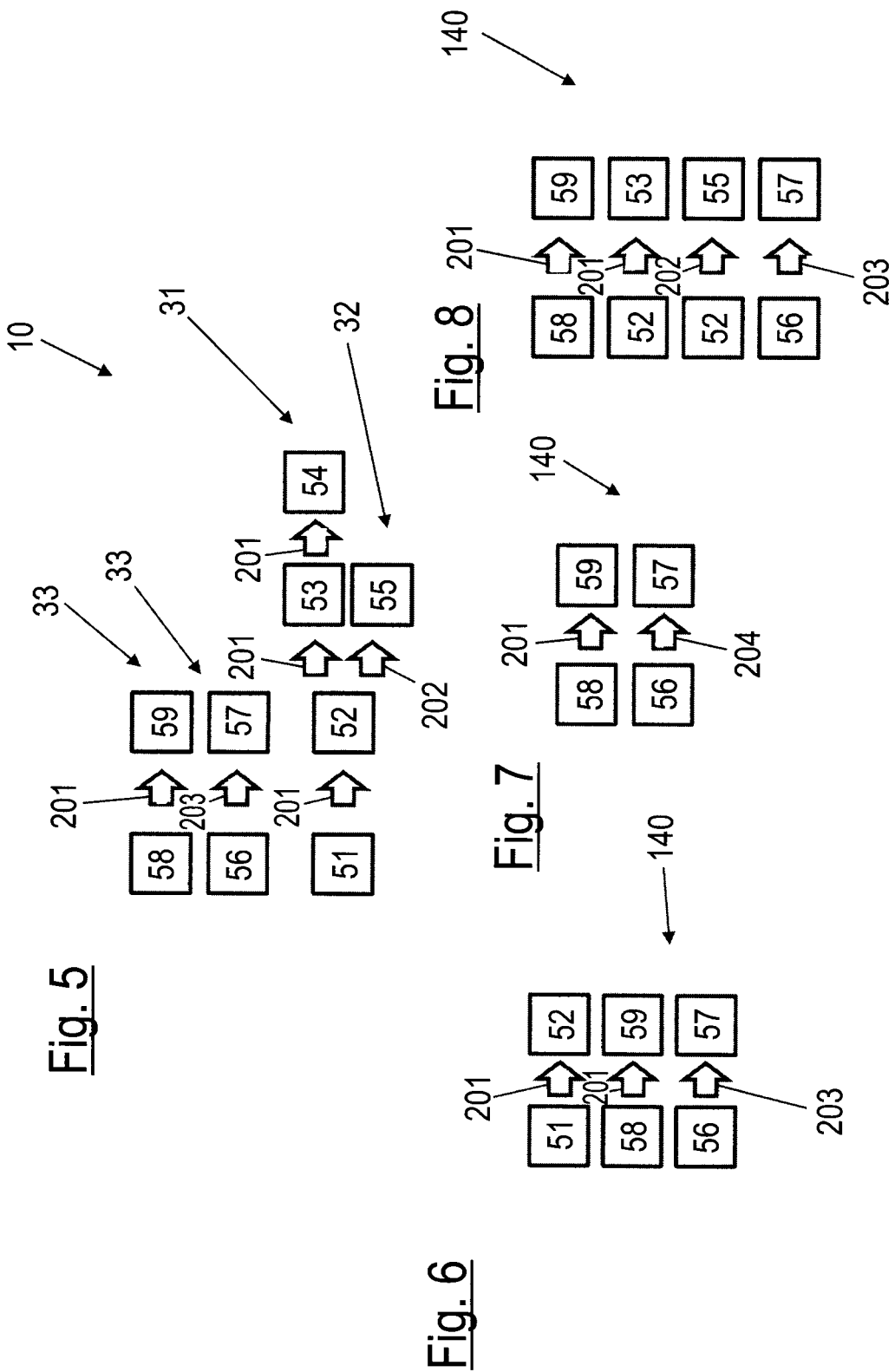

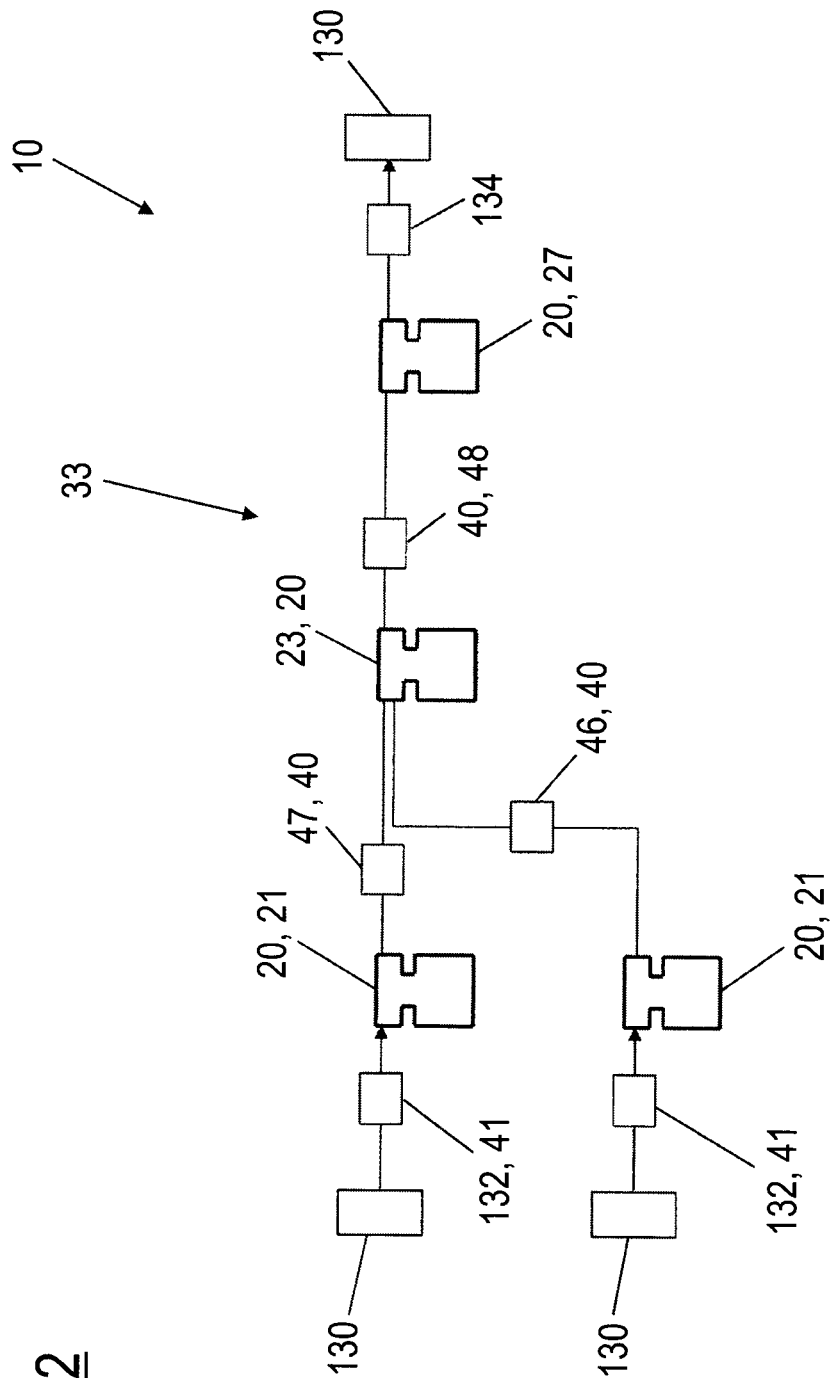

METHOD AND SYSTEM FOR EXECUTING AN EVENT-ORIENTED CONTROL PROGRAM

The present invention relates to a method of executing an event-oriented control program on a programmable logic controller of an automation system and to an execution environment for executing an event-oriented control program on a programmable logic controller of an automation system.

Automation systems comprising programmable logic controllers are used in automation technology, among other things, to control automated processes and machine sequences. For this purpose, the programmable logic controllers are usually connected to sensors of the automation systems that detect a state of the automated process and that transmit sensor signals representing the state of the process to the controller. The controller then generates output signals for controlling actuators of the automation systems on the basis of a logical link of the read-in sensor signals, wherein the actuators influence the state of the automated process on the basis of the output signals. Sensors can, for example, be position encoders, rotary encoders, switches, light barriers or similar, whereas actuators can, for example, be drives, relays, or contactors.

The logical links for processing the read-in sensor signals and for generating the output signals are usually components of a control program of the programmable logic controller that is stored in a memory module of the controller. To execute the control program, programmable logic controllers typically comprise an execution environment that executes the control commands of the control program in a predefined sequence. In addition, the execution environment can manage the working memory required for the execution of the control commands and/or can coordinate the reading in of the sensor signals and the output of the output signals.

To ensure a secure and reliable control of automated processes, the execution environment has to be configured to provide the output signals within predefined response times after the reading in of the sensor signals. Such systems are also designated as real-time-capable control systems. In this respect, the execution environment has to ensure that the predefined response times are maintained irrespectively of the utilization of the system and of possible programming errors. In the event of an exceeding of the response times, the execution environment can initiate suitable safety measures.

To ensure a reliable operation of the automation system, the programmable logic controller has to be able to execute responses that are essential for the execution of the process and that are thus time-critical as quickly as possible. For this purpose, it may be necessary to execute the logical links for executing the time-critical responses preferably before other logical links taking place on the controller.

Control systems for time-critical applications are typically implemented by means of cyclic execution environments. In such execution environments, fixed time windows are defined for the reading in of the sensor signals, the computing of the output signals, and the output of the output signals within each cycle, wherein the individual time windows repeat periodically in order over a plurality of cycles. The time windows then also define the maximum response times of the control system.

In addition to cyclic control programs and execution environments, event-controlled control programs, such as are defined in the IEC 61499 standard, are also used in automation technology. Such control programs comprise a plurality of function blocks, wherein the reading in of the sensor signals, the logical linking of the read-in sensor signals, or the output of the output signals is in each case implemented by combinations of individual function blocks and an additional user-defined program text (code). The execution of the function blocks in this respect takes place in an event-controlled manner on the occurrence of activation events that are each associated with the individual function blocks, wherein the activation events of function blocks to be subsequently executed are generated on the execution of preceding function blocks.

Event-controlled execution models are inter alia suitable for distributed control systems; however, due to the lack of predefined processing cycles, they provide few possibilities of ensuring a preferred execution of time-critical parts of the control program. To reduce the likelihood of time-critical response timeouts, the computing capacity of event-controlled controllers is usually far oversized, for example, by 50%. Sufficient computing capacity for a timely execution of the function blocks is then usually also still available in the case of a high utilization.

It is an object of the invention to provide a method of executing an event-oriented control program on a programmable logic controller of an automation system and an execution environment for executing an event-oriented control program on a programmable logic controller of an automation system such that a timely execution of time-critical parts of the control program is ensured.

This object is satisfied by a method of executing a control program on a programmable logic controller of an automation system and by an execution environment for executing a control program on a programmable logic controller of an automation system in accordance with the independent claims. Further developments are respectively set forth in the dependent claims.

A method is set forth that serves to execute an event-oriented control program on a programmable logic controller of an automation system, wherein the control program comprises a plurality of functional modules, the execution of the individual functional modules is triggered in an event-controlled manner on the occurrence of activation events that are each associated with the individual functional modules, and wherein priorities are assigned to each of the activation events. The method comprises the following steps:

detecting activation events that have occurred; and executing the functional modules that are each associated with the activation events that have occurred in an execution sequence defined on the basis of the priorities of the individual activation events.

It has been recognized within the framework of the invention that a timely execution of time-critical parts of the control program can be ensured in a particularly simple and flexible manner in that priorities are first assigned to the individual activation events that occur during the execution of the control program, and in that the order in which the individual functional modules are executed after the occurrence of their associated activation events is defined by the priorities of the respective activation events. Since the execution sequence of the functional modules is defined by the priority of the activation events, it is in particular possible to execute functional modules that can be triggered via a plurality of activation events with different priorities in dependence on the triggering activation event. This enables a considerably more flexible prioritization of the execution of time-critical program parts than would, for example, be the case with a rigid assignment of the priorities to the individual functional modules.

The functional modules of the control program can each comprise at least one logical link, wherein an execution of the logical links of the individual functional modules is in each case triggered by the activation events associated with the individual functional modules. The logical links of the individual functional modules can, for example, be a respective component of an algorithm of the respective functional module. A relationship of the activation events of the individual functional modules of the control program with one another can in each case be predefined via event links that connect the individual functional modules to one another. The control program can, for example, satisfy the specifications of the IEC 61499 standard and the functional modules can, for example, be function blocks defined in this standard.

Functional modules of the control program to be successively executed can each be configured to generate activation events on their execution, said activation events triggering the execution of the respective functional module of the control program to be executed directly afterwards. In this respect, the functional modules can, for example, be connected to form individual event chains via event links, wherein the activation event of each subsequent functional module of the event chain is generated on the execution of a functional module of the event chain executed directly beforehand.

In general, the event chains can each comprise all the activation events that are generated on the basis of a predefined initial event to trigger the execution of the functional modules to be executed in order up to an end module to be executed as the last functional module of the event chain. The initial event can, for example, be an external activation event that is provided on an activation of an external input interface of the execution environment. The external input interface can, for example, be an interface to an execution resource of the control unit executing the execution environment. The external input interface can in particular be an external interface, for instance a sensor input, of a device executing the control program.

The initial event can, for example, be provided on the basis of a sensor signal received by the control unit, for example, on a reception of the sensor signal by the control unit or on a status change of the sensor signal received by the control unit. An initial module activated by the initial event as the first functional module can, for example, be a service interface function block in accordance with IEC 61499 configured as a responder function block.

The end module is defined by the last functional module of the event chain after whose execution no more activation signals are generated for the execution of further functional modules of the control program. The end module can, for example, be a functional module that is configured to output an output signal for an actuator via an external output interface of the execution environment. The end module can, for example, be a service interface function block in accordance with IEC 61499 configured as a requester function block.

The activation of the initial module of the event chain can, for example, be triggered by an input signal, for example, a sensor signal. The event chain can, for example, comprise all the activation events that, triggered by a reception of the input signal, are generated in order until an output signal generated on the basis of the input signal is output via the output interface.

The detection of the activation events that have occurred and the execution of the functional modules that are each associated with the activation events that have occurred in the execution sequence defined by the priorities can, for example, in each case be performed by an execution environment running on the controller. For an execution by the execution environment, the control program can be stored in a memory module of the controller.

The execution environment can comprise a plurality of part environments that can be executed separately from one another, wherein the individual part environments are configured to be executed on separate execution resources of the controller. The execution resources can, for example, be tasks, processors, or the like. For example, the execution resources can be resources defined in IEC 61499.

The assignment of priorities to the individual activation events can, for example, take place on a creation of the control program, for example, by means of a programming environment configured to create the control program. The priorities can, for example, be assigned to the individual activation events in that they are assigned to individual event links between functional modules. In this respect, the event links in each case connect the functional module with which an individual activation event is associated and which is executed on an occurrence of the activation event to a previously executed functional module on whose execution the activation event is generated. The priorities associated with the individual activation events can be stored in the control program and can be used by the execution environment on the execution of the control program.

The order in which the individual functional modules are executed on a simultaneous presence of a plurality of execution events is determined by the execution sequence determined on the basis of the priorities of the individual activation events. In this regard, the priorities determine the order in which activation events that are present at the same time are processed. In this respect, a newly occurred activation event can, for example, be processed before all the activation events of a lower priority that occurred previously and after all the activation events of a higher priority that occurred previously.

In addition to the priorities, a predetermined processing strategy can be used to process the activation events that have occurred. Such a processing strategy can, for example, be FIFO (first-in-first-out), LIFO (last-in-first-out), depth first, or breadth first. The processing strategy can, for example, determine the order in which activation events of the same priority that have occurred are processed.

The execution environment can manage at least one processing list to define the execution sequence and can comprise a list management module for this purpose. Such a processing list can also be designated as an event queue. The execution environment can comprise at least one processing list, for example exactly one processing list, for each execution resource.

The execution environment can be configured to perform an event-controlled time lapse control (event triggered scheduling). The execution environment can also be configured to distribute an available computing power of the programmable logic controller to the individual functional modules of the control program in accordance with predefined criteria, for example, uniformly (fair scheduling). The execution environment can implement a cyclic time lapse control for this purpose. For example, the execution environment can cyclically scan all the instances of functional modules for pending activation events (cyclic scan approach) and can process pending activation events in accordance with the processing sequence predefined by the priorities.

The control program can comprise time-critical functional modules and non-time-critical functional modules. The time-critical functional modules can be connected to form a time-critical event chain via time-critical event links and the non-time-critical functional modules can be connected to form a non-time-critical event chain via non-time-critical event links. The activation events of the time-critical event links can then each be assigned a higher priority than the activation events of the non-time-critical event links.

Time-critical output signals can, for example, be generated by means of the time-critical event chain after a reading in of time-critical input signals. The time-critical input signals and/or the time-critical output signals can, for example, be input signals or output signals essential to the process and/or machine-critical and/or safety-relevant and/or safety-related input signals or output signals. In this respect, signals essential to the process can be necessary for the direct execution of the controlled process, for example, an ongoing machine movement. Machine-critical signals can be signals that are necessary for the operability of the machine. Safety-relevant or safety-related signals can be signals that are necessary to avoid machine damage and/or personal injury. The time-critical event chain can, for example, perform a safety function. However, the time-critical event chain can also perform a response to an exception event that occurred on the execution of the control program. The exception event can, for example, be an error and the response can be an error response. The exception event can also be an alarm and the response can be an alarm response.

The specified method can in particular be used to perform a prioritized execution of time-critical program parts of the event-oriented control program. In this respect, it is not necessary that the execution sequence of all the functional modules of the control program is managed by a central service of the execution environment. This, for example, makes it possible to also prioritize parts of the control program in an execution environment distributed over a plurality of execution resources. In this respect, a communication of all the execution resources with one another is in particular not necessary. This, above all, makes it possible to dispense with a central error handler during the execution of the control program.

The automation system can, for example, control machines or self-driving vehicles in an automated manner. The automation system can, for example, comprise drives that are controlled by means of the control program. The automation system can additionally or alternatively also implement safety functions and can be a safety-related control system in this regard.

In a further development of the method, the control program has a common functional module whose execution can be triggered by a first and a second activation event, wherein different priorities are assigned to the first and second activation events. In this respect, the common functional module is executed with the priority of the first activation event on a triggering by the first activation event and is executed with the priority of the second activation event on a triggering by the second activation event. This enables a particularly flexible adaptation of the execution sequence to the events triggering the individual functional modules.

For example, the first activation event can be part of a time-critical event chain and the second activation event can be part of a non-time-critical event chain, wherein the first activation event is assigned a higher priority than the second activation event. A third activation event for activating a further functional module can be assigned a third priority that is lower than the priority of the first activation event and that is higher than the priority of the second activation event. If the common functional module is now triggered by the first activation event, it is executed before the further functional module, whereas, if it is triggered by the second activation event, it is executed after the further functional module.

In a further development, the method comprises entering the activation events that have occurred in at least one processing list, taking into account the priorities of the individual activation events. Such a processing list enables a particularly simple definition and monitoring of the processing sequence.

The priorities of the individual activation events can in this respect define the position at which a newly occurred activation event is entered in the processing list. For example, a newly occurred activation event can be entered in the processing list such that it is executed before all the activation events of a lower priority in the list and after all the activation events of a higher priority in the list.

The processing list can be processed by means of the predetermined processing strategy. The processing strategy can, for example, determine the position at which the newly occurred activation event is arranged relative to activation events of the same priority that are already in the list.

To define the positions at which newly occurred activation events of a predefined priority are entered in the processing list, the execution environment can also manage a plurality of pointers, for example in a pointer list, wherein the plurality of pointers comprise a respective one pointer for each possible priority. In this respect, the pointers of the individual priorities in each case indicate that position in the processing list at which a newly occurred activation event of the respective priority is to be entered.

In a further development of the method, activation events of different priorities are entered in different processing lists and the individual processing lists each only comprise activation events of the same priority. This enables a particularly resource-efficient definition of the processing sequence since a search within a single processing list, in which the position for the entry of a newly occurred activation event of a predefined priority is determined, can be dispensed with.

If a separate processing list is managed for each possible priority, the execution environment can be configured to determine an activation event to be processed next in that the individual processing lists are checked in descending order, starting with the highest priority, for activation events present in the individual lists.

In a further development of the method, functional modules triggered by newly detected activation events are executed later than functional modules that are triggered by already previously detected activation events of the same priority. This corresponds to an execution sequence of activation events of the same priority in accordance with the FIFO principle. In this respect, the available execution time is distributed uniformly over all the activation events of the same priority that have occurred so that a possible fast and uniform processing of activation events of the same priority is ensured.

In a further development of the method, functional modules triggered by newly detected activation events are executed earlier than functional modules that are triggered by already previously detected activation events of the same priority. This corresponds to an execution sequence of activation events of the same priority in accordance with the LIFO principle. It can thereby be achieved that an event chain being processed is first completely processed before the processing of further event chains is started. Program parts executed by individual event chains can thereby be executed particularly quickly. In addition, the working memory and/or cache of the programmable logic controller can be used particularly efficiently since intermediate results generated during the processing of the functional modules of the executed event chain are immediately reused.

In a further development of the method, the programmable logic controller comprises a first execution resource and a second execution resource connected to the first execution resource via a communication link and the control program comprises a first part program executed on the first execution resource and a second part program executed on the second execution resource. In this respect, the method comprises transmitting activation events that have occurred on the first execution resource from the first execution resource to the second execution resource via the communication link, wherein the transmission takes place with transmission priorities determined on the basis of the priorities of the individual activation events.

Not only a prioritization of individual program parts of the control program within the individual execution resources, but also a prioritization across a plurality of execution resources arranged in a distributed manner is thereby possible. The transmission priority can, for example, correspond to the priority of the individual activation events. The second execution resource can be configured to further process the activation events received via the communication link in an execution sequence defined by the priorities of the individual activation events.

The communication link can be an internal communication link within a part device of the programmable logic controller, wherein the internal communication link connects a plurality of execution resources present on the part device for executing the control program. The communication link can also be an external communication link between a plurality of part devices of the programmable logic controller, for instance, a fieldbus. The individual activation events can be transmitted on the communication link by means of a fieldbus protocol, for example. Alternatively or additionally, the activation events can be transmitted by means of a connectionless or connection-oriented transmission protocol, for example, by means of UDP, TCP, or the like. The individual activation events can be transmitted on the communication link in individual data packets, wherein the transmission priority is assigned to the individual data packets for the forwarding on the communication link.

In a further development of the method, a transmission sequence with which the individual activation events are transmitted by a transmission unit of the first execution resource via the communication link is defined on the basis of the priorities of the individual activation events. For example, the execution environment can be configured to store the individual activation events in a transmission queue of the transmission unit in accordance with their priority. In this respect, the activation events can be entered in the transmission queue in the same way as described in connection with the processing list.

The transmission unit can, for example, establish a connection of a part device of the programmable logic controller to the communication link. The transmission unit can, for example, be a transmission unit of a fieldbus module for connecting the part device to a fieldbus.

Alternatively or additionally, a forwarding sequence with which the individual activation events are forwarded on the communication link is defined on the basis of the priorities of the individual activation events. The data packets including the individual activation events can in particular be forwarded in accordance with the forwarding sequence via the communication link, for example, by intermediate devices, for instance routers or switches, arranged in the communication link.

Alternatively or additionally, an output sequence with which the individual activation events, after their reception via the communication link, are output by a reception unit of the second execution resource for further processing is defined on the basis of the priorities of the individual activation events. For example, the execution environment can be configured to hold the individual activation events unit in accordance with their priority in a reception queue of the reception unit for a further processing by the second part program. In this respect, the activation events can be entered in the reception queue in the same way as described in connection with the processing list.

In a further development of the method, individual activation events are only assigned their priority at an execution time of the control program, for example, taking into account a parameter value generated at the execution time. This enables a particularly flexible prioritization of the individual activation events. The individual activation events can, for example, be assigned their priority on their generation by the individual functional modules of the control program.

In a further development of the method, the activation events of functional modules to be subsequently executed are generated on the execution of previously executed functional modules, wherein, on their generation, the activation events of the functional modules to be subsequently executed are assigned the priorities of those activation events that triggered the execution of the respective previously executed functional modules. All the activation events of individual event chains of the control program can thereby, for example, be assigned the same priority in an automated manner. It is in particular only necessary to assign a priority to an individual activation event of a plurality of activation events generated successively and to store said priority in the control program, for example. All further priorities are then dynamically generated at the execution time of the control program.

Separate priorities can also be stored in the control program for individual ones of the successively processed activation events. The execution environment can then be configured to assign to these individual activation events the priorities stored in the control program instead of the priorities of the activation events for executing the functional modules that generate the respective individual activation events.

In a further development of the method, the control program comprises a functional module whose execution is only triggered on the occurrence of a first and at least a second activation event, wherein an activation event generated by this functional module is assigned a priority that corresponds to the lowest priority of the activation events triggering the execution of the functional module. It is thereby made possible to assign a unique priority in an automated manner to the activation event generated in this manner. At the same time, it is avoided that the activation event is assigned an unnecessarily high priority.

In a further development of the method, a plurality of subsequent activation events are generated on the execution of the control program on the basis of a source event and a programming environment for creating the control program assigns the same priority in an automated manner to the plurality of subsequent activation events. The priorities of the individual activation events can thereby be particularly easily assigned to them.

For example, the control program comprises an event chain having activation events generated successively on the execution of the control program on the basis of the source event and the programming environment for creating the control program assigns the same priority in an automated manner to the plurality of activation events of the event chain.

The subsequent activation events can comprise activation events of functional modules that are successively executed. Alternatively or additionally, the subsequent activation events can also comprise activation events of functional modules that are executed quasi in parallel, for instance, a plurality of activation events that are created on the execution of a single functional module.

The source event can, for example, be the initial event of the event chain. The source event can generally also be an external activation event.

The programming environment can be configured to detect the individual event chains in an automated manner. For this purpose, the programming environment can, for example, identify all the functional modules executed in response to an input signal until the generation of an output signal of the programmable logic controller generated in dependence on the input signal, or all the functional modules that are executed until a status change of the controller that takes place in dependence on the input signal. If an individual functional module in this respect comprises a plurality of event inputs and/or a plurality of event outputs, the programming environment can thus create a separate event chain for every possible combination of event inputs and event outputs.

Alternatively, in a functional module comprising a plurality of event inputs and/or event outputs, internal connections between the event inputs and event outputs can be determined within the functional module and a separate event chain can be created only for each activation of an event output that takes place on the execution of the functional module in response to the activation events received at the individual event inputs. To determine the connections between the event inputs and event outputs, the programming environment can receive a user input that predefines the connections. The programming environment can also be configured to analyze the logical links or algorithms executed in each case via the individual event inputs on the activation of the functional module, and to determine the event outputs activated in response to the individual activation signals applied at the event inputs, and to derive the connections between the event inputs and the event outputs therefrom.

The programming environment can, for example, be configured to assign in an automated manner a priority assigned to an individual activation event of the event chain to all the subsequently generated activation events and/or all the previously generated activation events. The programming environment can, for example, be configured to perform the automated assignment only on the reception of a confirmation by the user via an input interface.

In a further development of the method, the priority assigned to the plurality of activation events can be predefined by a user of the programming environment. This enables a user-defined adaptation of the priorities of the event chain.

In a further development of the method, the priority assigned to the plurality of activation events can be predefined by a user of the programming environment. This enables a user-defined adaptation of the priorities of the event chain.

For example, on a user-defined adaptation of the priority of an individual activation event of the event chain, the same priority can be assigned to all subsequent activation events of the event chain by the programming environment. Alternatively or additionally, all preceding activation events of the event chain can also be assigned the same priority.

The programming environment can also be configured to indicate all the identified event chains to a user and to receive a respective user input for the individual event chains that determines the priority of the event chain. Subsequently, this priority can be taken over for the individual activation events of the event chain. A respective separate priority can hereby, for example, be defined for individual output signals generated in response to an applied input signal.

In a further development of the method, the priorities assigned in an automated manner can be adapted by the user within the programming environment. For example, the programming environment can be configured to indicate to the user, via a user interface, all the activation events whose priorities are adapted in an automated manner in response to a user input and to receive, via an input interface, a user input for adapting the priorities assigned in an automated manner.

This user input can, for example, comprise adaptation values for the priorities of individual ones of these activation events. Alternatively, the user input can also comprise deselecting individual activation events so that the priorities of the individual deselected activation events are not adapted in an automated manner. In response to the user input, the programming environment can in turn in an automated manner deselect some of the activation events of the event chain, for example all the activation events that follow and/or precede the activation event for which the user input is received, or assign the adaptation value as a priority to them.

In a further development of the method, a predetermined priority is assigned to individual activation events, wherein the predetermined priority is predefined by a predefined priority of an event output or of an event input of a template for a program module used on the creation of the control program, for example, a template for a functional module or interface module used on the creation of the control program. It is hereby possible to provide individual program modules of the control program, in particular functional modules, with predefined values of the activation events generated or received by them.

On the creation of the program module from the template, the predetermined priority can be assigned to all the activation events that are transmitted via the event output or the event input. The templates for the program module can in particular be class definitions of the respective program module from which the individual program modules are derived as instances on the creation of the control program.

An execution environment for executing an event-oriented control program on a programmable logic controller of an automation system is further set forth, wherein the control program comprises a plurality of functional modules. The execution environment is configured to trigger an execution of the individual functional modules in an event-controlled manner on the occurrence of activation events that are each associated with the individual functional modules. In this respect, priorities are assigned to each of the activation events and the execution environment is configured to detect activation events that have occurred and to execute the functional modules associated with the activation events that have occurred in an execution sequence defined on the basis of the priorities of the individual activation events.

The execution environment is in particular configured to execute the steps of the specified method that are performed during the runtime of the control program. In this respect, all the technical effects and further developments that have been described in connection with the specified method also relate to the execution environment and vice versa.

In addition, a programmable logic controller having a memory module is set forth, wherein the specified execution environment is stored in the memory module for execution by the controller. The controller can provide a plurality of execution resources. In this respect, the execution resources can be arranged at least partly distributed in different part devices of the controller. The part devices can be connected to one another via a communication link, for instance, a wireless and/or wired link. The communication link can be a fieldbus system, for example. The part devices can each comprise their own memory modules formed separately from one another and the part environments of the execution environment to be executed by the respective part devices can in each case be stored in the memory modules.

The programmable logic controller, in particular its part devices, can have external input interfaces for connecting sensors and external output interfaces for connecting actuators and can be configured to read in sensor signals from an automated process via the external input interfaces and to output output signals to the automated process via the output interfaces.

Furthermore, an automation system having such a programmable logic controller is set forth. The automation system, for instance the programmable logic controller and/or interface modules of the automation system connected to the programmable logic controller, can have external input interfaces for connecting sensors and external output interfaces for connecting actuators and can be configured to read in sensor signals from an automated process via the external input interfaces and to output output signals to the automated process via the output interfaces.

A non-volatile, computer-readable medium is further set forth on which instructions for executing individual steps or all the steps of the specified method or for implementing the described execution environment are stored. The computer-readable medium can, for example, be configured as a physical medium, for instance as a CD or DVD, or as a data storage location that is accessible via a data link, for example the Internet. The medium can, for example, be designed as an online software repository or as a cloud data store.

Figure 2:
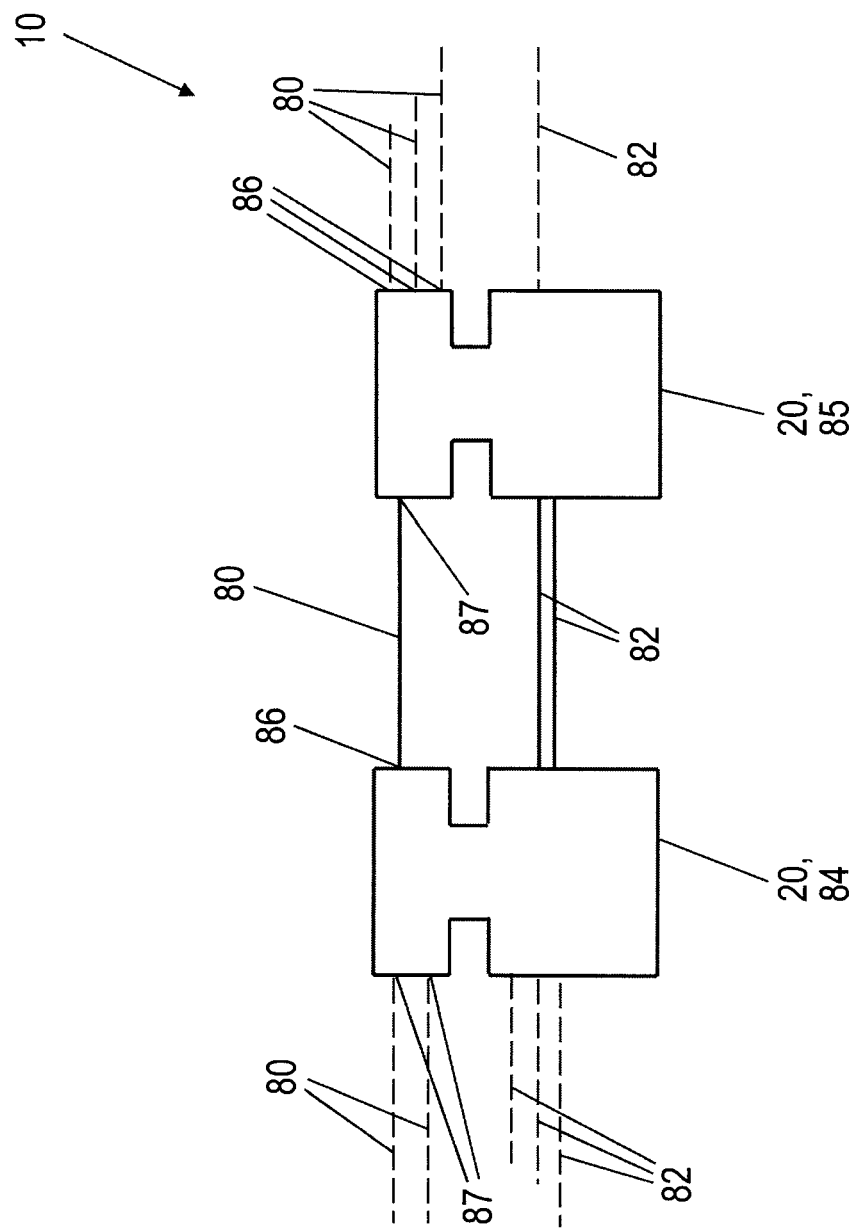
Figure 3:
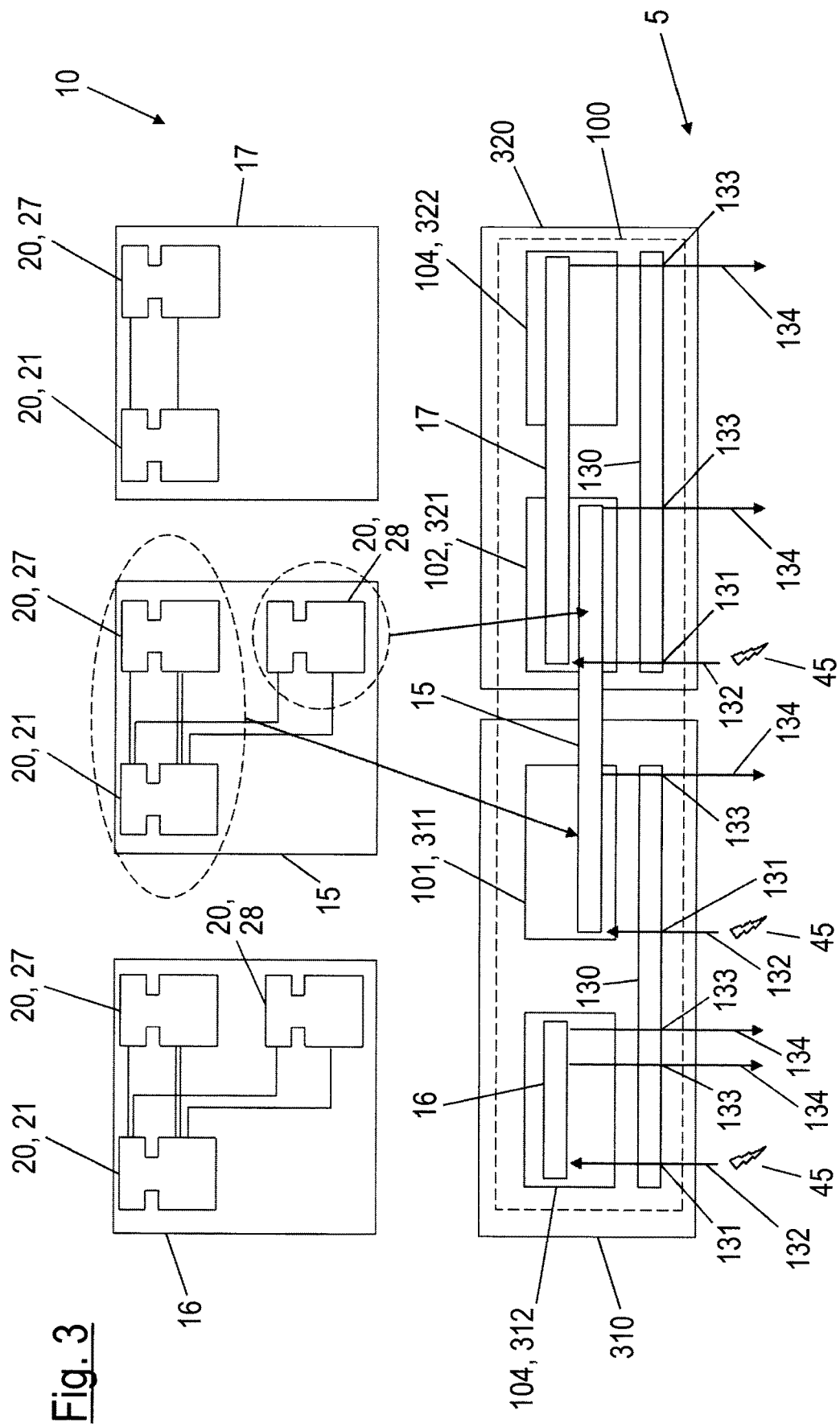
Figure 4:
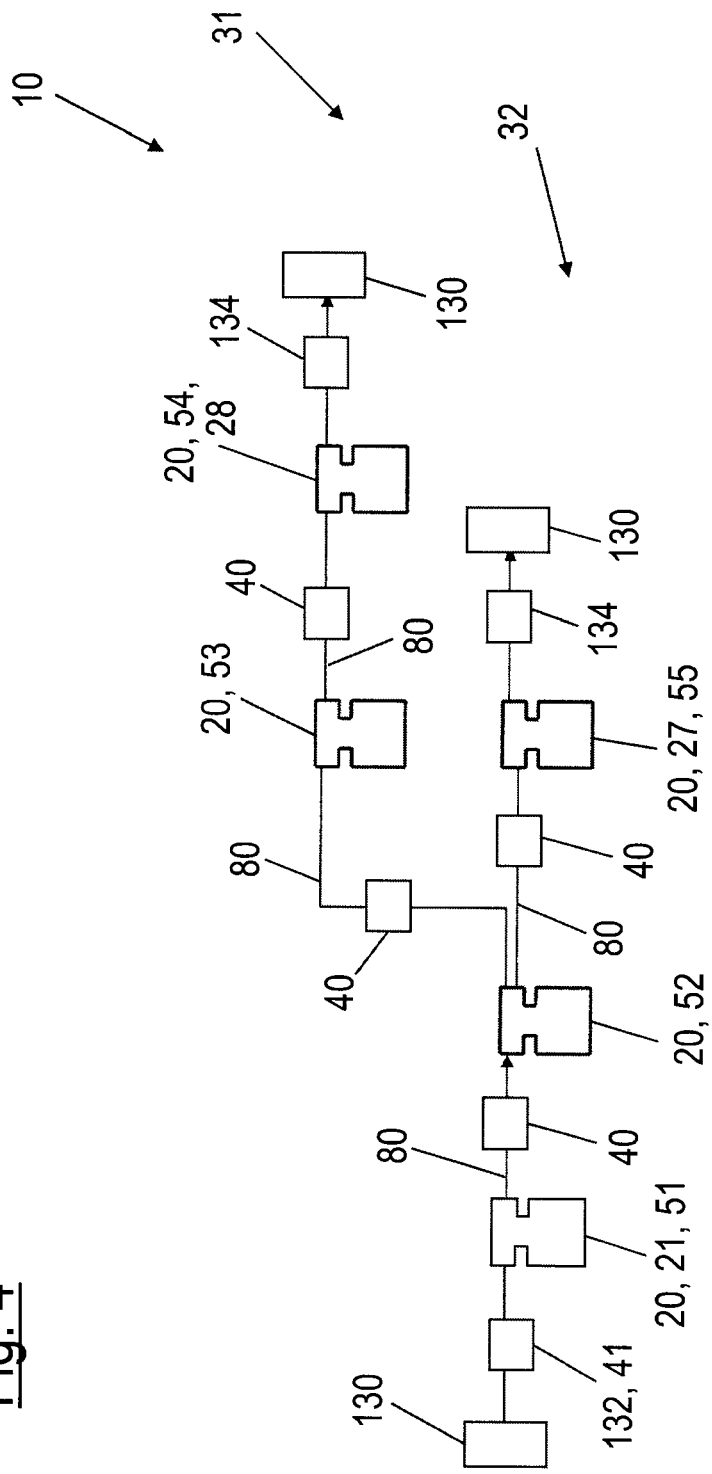
Figure 9:
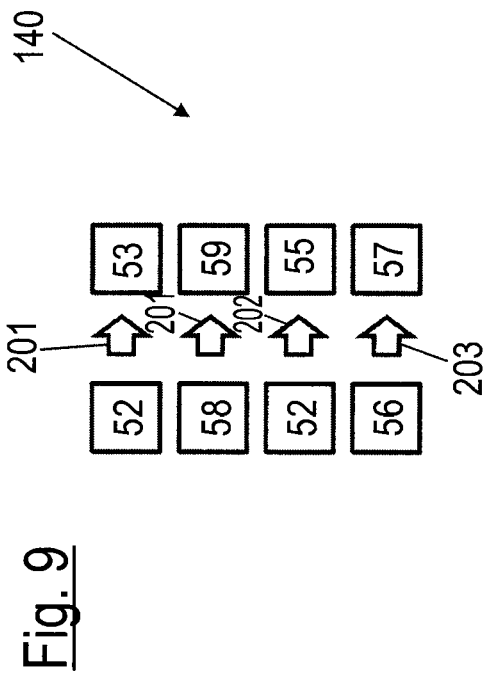
Figure 11:
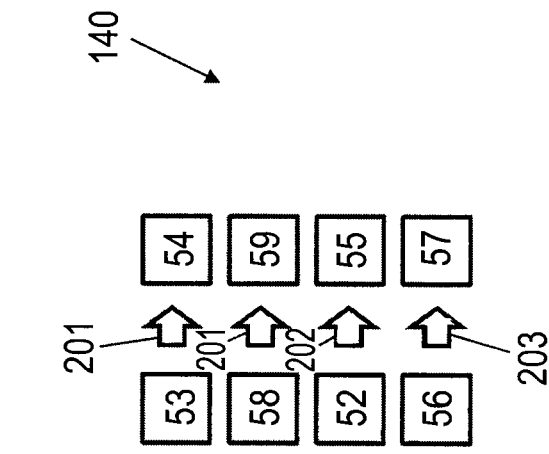
Figure 10:
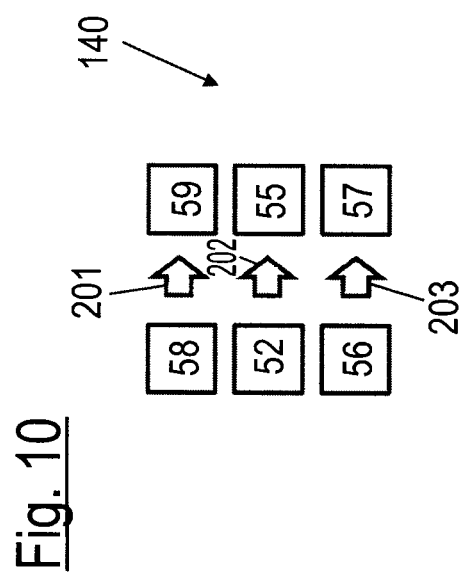
Figure 13:
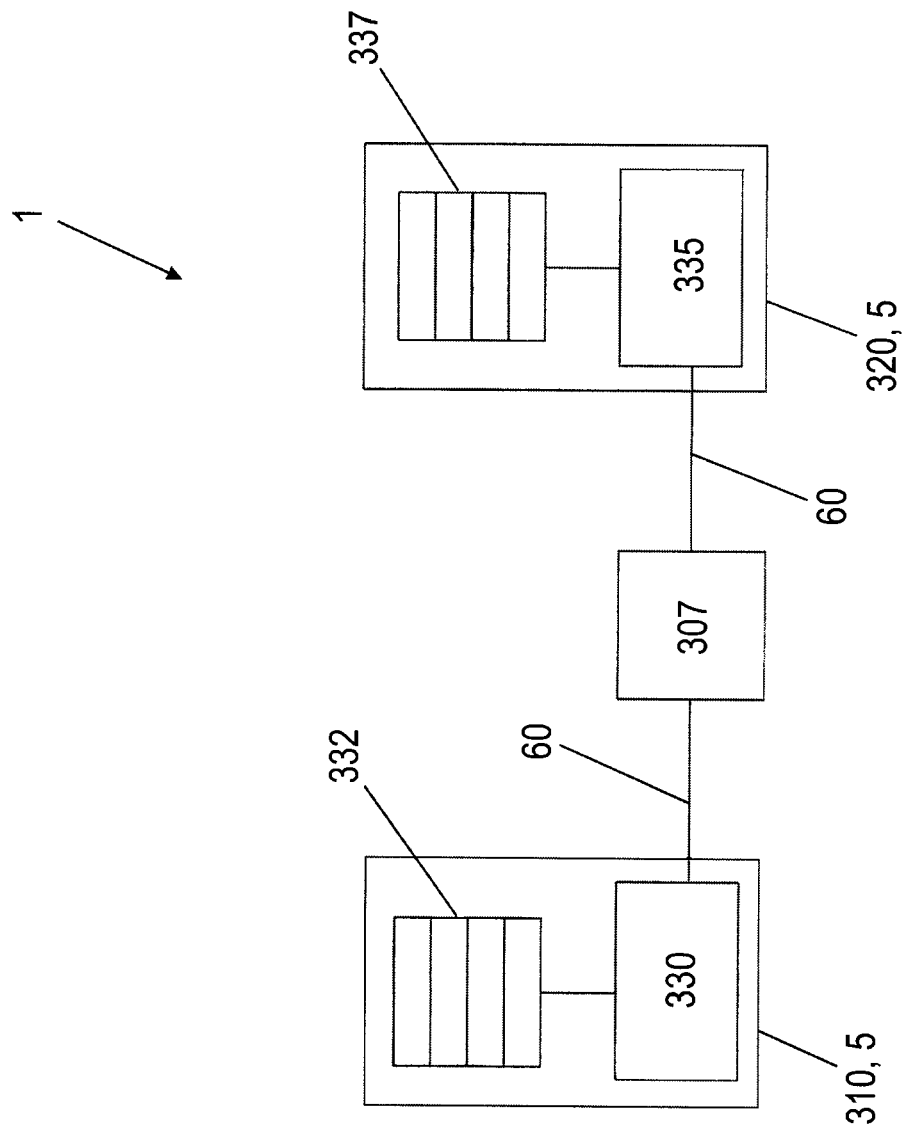
Figure 14:
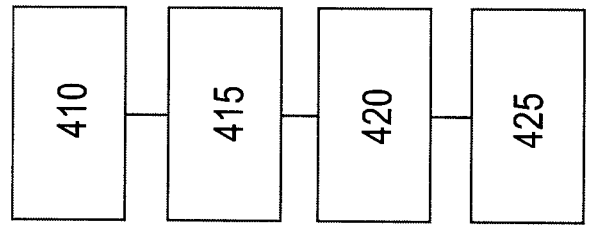

The invention will be explained in the following with reference to Figures. In this respect, there are shown in a schematic representation in each case:

FIG. 1 an automation system comprising a controller for executing an event-controlled control program;

FIG. 2 functional modules of the control program;

FIG. 3 an execution environment for executing the control program by the controller;

FIG. 4 a first and a second event chain of the control program;

FIG. 5 priorities assigned to activation events of the first and second event chains;

FIG. 6 a processing list managed by the execution environment for the execution of the control program at a first point in time;

FIG. 7 the processing list at a later second point in time;

FIG. 8 the processing list at an even later third point in time;

FIG. 9 an alternative form of the processing list at the third point in time;

FIG. 10 the alternative form of the processing list at a subsequent fourth point in time;

FIG. 11 the alternative form of the processing list at a subsequent fifth point in time;

FIG. 12 a further event chain of the control program;

FIG. 13 first and second part devices of the controller connected via a communication link; and FIG. 14 a method of executing the control program.

FIG. 1 shows an automation system that is configured by way of example as a machine 1 for handling workpieces 195. The machine 1 comprises a conveyor 186 on which the workpieces 195 are delivered, and a gripper 181 by means of which the workpieces 195 are picked up from the conveyor 186 and subsequently deposited elsewhere. To move the gripper 181, the machine 1 comprises a transverse kinematic unit 182 driven by a first actuator 183, and a vertical kinematic unit 184 driven by a second actuator 185. The conveyor 186 is driven by a third actuator 187. The actuators 183, 185,187 are in this respect each configured as electric drives.

In addition to the actuators 183, 185, 187, the machine 1 comprises a time-critical sensor 188 that measures the spacing of the gripper 181 from the individual workpieces 195 on the conveyor 186, and a further, non-time-critical sensor 189 which is configured as a user interface and via which characteristic data of the workpieces 195 can be predefined.

The machine 1 furthermore comprises a programmable logic controller 5 connected to the actuators 183, 185, 187 and the sensors 188, 189 via an external communication link 60 configured as a field bus. The programmable logic controller 5 comprises a first part device 310 and a second part device 320 that are connected to the communication link 60 separately from one another. Via the communication link 60, input signals are transmitted from the sensors 188, 189 to the part devices 310, 320 of the controller 5 and output signals are transmitted from the part devices 310, 320 to the actuators 183, 185, 187.

The controller 5 has an event-oriented control program 10, wherein a first part program 11 of the control program 10 is stored in a memory module of the first part device 310 and a second part program 12 of the control program 10 is stored in a memory module of the second part device 320. The control program 10 comprises all the instructions for reading in the sensor signals via the communication link 60, for generating the output signals by means of a logical link of the read-in sensor signals, and for outputting the output signals via the communication link 60.

To execute the control program 10, the controller 5 comprises an execution environment 100 having a first part environment 101 executed on the first part device 310 and a second part environment 102 executed on the second part device 320. The part environments 101, 102 of the execution environment 100 each comprise execution modules 120 for executing the control program 10.

On the execution of the control program 10, it has to be ensured that the actuators 183, 185 for moving the gripper 181 respond in a prioritized manner within predefined time durations to an input signal read in via the time-critical sensor 188 to indicate an approach of the gripper 181 to the workpieces 195. Otherwise, there would be a risk of the gripper 181 colliding in an uncontrolled manner with the workpieces 195 and damaging them. In this respect, the input signals provided by the time-critical sensor 188 represent time-critical input signals and the response of the gripper 181 to the input signals read in via the time-critical sensor 188 represents a time-critical response of the control program.

In contrast, the parameters of the workpieces 195 read in via the sensor 189 are only used to optimally adapt the movement of the gripper 181 to the mass inertia of the workpieces 195. For this purpose, the read-in parameters are used on the execution of the control program 10 to create adapted output signals for the actuators 183, 185. The creation of the adapted output signals represents a non-time-critical response of the control program 10 that is not subject to any time requirements and that is therefore executed with a lower priority than the response of the gripper 181 to the sensor signals of the sensor 188.

The control program 10 is designed in accordance with the specifications of the IEC 61499 standard and comprises a plurality of functional modules configured as function blocks in accordance with IEC 61499. Two of these functional modules 20 are shown by way of example in FIG. 2. The individual functional modules 20 are each connected to one another via event links 80 and data links 82. In this respect, the individual event links 80 each connect an event output 86 of a preceding functional module 84 to an event input 87 of a subsequent functional module 85. Via the event inputs 87, the individual functional modules 20 receive activation events that trigger an execution of the individual functional modules 20. Via the event outputs 86, the individual functional modules 20 in turn provide activation events that cause an execution of subsequent functional modules 85. The data required for the execution of the individual functional modules 20 are transmitted between the functional modules 20 via the data links 82.

FIG. 3 shows the implementation of the execution environment 100 on the part devices 310, 320 of the programmable logic controller 5. To execute the control program 10, the first part device 310 provides a first execution resource 311 and a second execution resource 312. The second part device 320 provides a third execution resource 321 and a fourth execution resource 322. The first part environment 101 of the execution environment 100 is executed on the first execution resource 311 and the second part environment 102 is executed on the third execution resource 321. Further part environments 104 of the execution environment 100 are in each case executed on the second and fourth execution resources 312, 322.

The control program 10 comprises a first application 15, a second application 16, and a third application 17. The applications 15, 16, 17 each comprise functional modules 20 connected via event and data links, wherein the first and second applications 15, 16 each comprise an initial module 21 and a respective one first and second end module 27, 28 connected to the initial module 21 of the respective application 15, 16. The third application 17 comprises only a single end module 27 connected to an initial module 21. In this respect, the individual end modules 27, 28 can be connected to their respective initial module 21 via additional functional modules 20, not shown in FIG. 3, in each case. Furthermore, the individual applications 15, 16, 17 can each have more than one initial module 21. The initial modules 21 are each service function blocks in accordance with IEC 61499 configured as responder function blocks.

On an execution of the control program 10, all the functional modules 20 connected to one another via event links are executed in order, starting from the individual initial modules 21, until the execution of the individual end modules 27, 28. The first application 15 is executed distributed in the first part environment 101 on the first execution resource 311 and in the second part environment 102 on the third execution resource 321. In this respect, a program part resulting in the execution of the first end module 27 is executed completely in the first part environment 101 and a program part resulting in the execution of the second end module 28 is executed partly in the first part environment 101 and partly in the second part environment 102. The second application 16 is executed completely in the further part environment 104 executed on the second execution resource 312 and the third application 17 is executed in a distributed manner in the second part environment 102 and the further part environment 104 executed on the fourth execution resource 322.

In the control program 10 shown, the execution of the initial modules 21 is in each case triggered by external origin events 45 that consist of the acquisition of sensor signals 132 by the sensors 188, 189. The sensor signals 132 are transmitted to the part devices 310, 320 of the controller 5 via the communication link 60 and are read in by interface modules 130 of the execution environment 100 via external input interfaces 131 connected to the communication link 60. On the execution of the end modules 27, 28, output signals 134 are in each case created for the actuators 183, 185, 187 of the machine 1 and are transmitted to the actuators 183, 185, 187 via external output interfaces 133 of the interface modules 130 and the communication link 60 connected to the output interfaces 133.

If successive functional modules 20 are executed on different execution resources 311, 312, 321, 322, the event and data links between the respective functional modules 20 are executed via communication links that connect the execution resources 311, 312, 321, 322 to one another, for example, via the field bus 60 shown in FIG. 1 when execution resources 311, 312, 321, 322 are executed on different part devices 310, 320 or via internal bus systems of individual part devices 310, 320 when execution resources 311, 312, 321, 322 are executed on the same part device 310, 320.

A programming environment used to create the control program 10 is configured to recognize respective individual event chains, wherein the individual event chains each detect all the activation events of those functional modules 20 that are executed in order in response to the input signals 132 until the execution of one of the end modules 27, 28. In this respect, a separate event chain is formed for each combination of the input signals 132 and one of the end modules 27, 28 executed on the basis of the respective input signals 132.

FIG. 4 shows a first event chain 31 and a second event chain 32 of the control program 10. The first and second event chains 31, 32 start with the same initial event 41 that is generated on the reading in of a sensor signal 132 via the interface module 130. The initial event 41 triggers the execution of a first functional module 51 that, as a responder function block, forms an initial module 21 of both the first and the second event chain 31, 32.

On the execution of the first event chain 31, activation events 40 are then successively generated to execute a second functional module 52, a third functional module 53, and a fourth functional module 54. The fourth functional module 54 forms an end module 28 of the first event chain 31. It generates an output signal 134 that is output via the external output interface 133 of the execution environment 100.

On the execution of the second event chain 32, activation events 40 for executing the second functional module 52 and a fifth functional module 55 are generated after the execution of the first functional module 52. The fifth functional module 55 forms an end module 27 of the second event chain 32 and generates a further output signal 134 for output via an external output interface 133 of the interface module 130.

In alternative embodiments, one of the end modules 27, 28 or both of the end modules 27, 28 can also change an internal status of the controller 5, for example, in addition to outputting the output signals 134 or alternatively to outputting the output signals 134. Furthermore, one of the further functional modules 51, 52, 53 or a plurality of or all of the further functional modules 51, 52, 53 can also generate an output signal 134 or change an internal status of the controller 5.

The individual activation events 40 of the first and second event chains 31, 32 are each assigned priorities that are shown in FIG. 5. The activation event 40 for executing the second functional module 52 that is generated by the first functional module 51 is assigned a first priority 201 that is also assigned to all further activation events 40 of the first event chain 31, namely to the activation event for executing the third functional module 53 that is generated by the second functional module 52 and to the activation event for executing the fourth functional module 54 that is generated by the third functional module 53. The activation event for executing the fifth function module 55 that is likewise generated on the execution of the second function module 52 is assigned a second priority 202.

As shown in FIG. 5, the control program 10 also comprises even further event chains 33, wherein one of the further event chains 33 comprises a sixth and a seventh functional module 56, 57 and the other of the further event chains 33 comprises an eighth and a ninth functional module 58, 59. The sixth functional module 56 generates an activation event having a third priority 203 for executing the seventh functional module 57 and the eighth functional module 58 generates an activation event having the first priority 201 for executing the ninth functional module 59.

The first, second, and third priorities 201, 202, 203 form descending priorities in sequence so that the first priority is the highest priority and the third priority is the lowest priority. On the execution of the control program 10, the activation events generated by the first, sixth, and eighth functional modules 51, 56, 58 are present at the same time; for example, they are provided after one another and detected by the execution environment 100 substantially at the same time, that is within a short time compared to the execution duration of the functional modules, and the two activation events generated by the second functional module 52 are additionally present at a later point in time. For example, the activation events generated by the second functional module 52 are likewise provided and detected substantially at the same time.

FIG. 6 shows a processing list 140, which manages a list management module, not shown, of the execution environment 100 for executing the control program 10 at a first point in time after the detection of the activation events generated by the first, sixth, and eighth functional modules 51, 56, 58. In the processing list 140, these activation events are arranged in descending order in accordance with their priorities 201, 203 starting from the highest priority, namely the first priority 201, to the lowest priority, namely the third priority 203.

FIG. 7 shows the processing list 140 at a later second point in time during the execution of the second functional module 52 that is executed first in accordance with the execution sequence defined by the processing list 140. During the execution of the second functional module 52, the processing list 140 still comprises the activation event having the third priority 203 for executing the seventh functional module 57 and the activation event having the first priority 201 for executing the ninth functional module 59.

FIG. 8 shows the processing list 140 at an even later third point in time after the execution of the second functional module 52. The activation event having the first priority 201 for activating the third functional module 53 and the activation event having the second priority 202 for activating the fifth functional module 55 were generated on the execution of the second functional module 52. After their detection by the execution environment 100, these two activation events are inserted into the processing list 140 based on their priorities 201, 202.

In this respect, the activation event for activating the fifth functional module 55, which has the second priority 202, is inserted between the activation event having the first priority 201 for activating the ninth functional module 59 and the activation event having the third priority 203 for activating the seventh functional module 57. The position of the activation event having the first priority 201 for activating the third functional module 53 is determined by the execution environment 100 in accordance with the FIFO principle so that the respective activation event is inserted after the activation event for executing the ninth functional module 59, which is already in the processing list 140 and which also has the first priority 201, and before the activation events for activating the fifth and seventh functional modules 55, 57 that have the second or third priority 202, 203.

FIG. 9 shows the processing list 140 at the third point in time in an alternative design of the execution environment 100 that uses the LIFO principle instead of the FIFO principle on the determination of the position of the activation event for activating the third functional module 53. In this respect, the respective activation event is inserted into the processing list 140 even before the activation event of the same priority for activating the ninth functional module 59.

FIG. 10 shows the processing list 140 on the application of the LIFO principle at a subsequent fourth point in time during the execution of the third functional module 53. After the execution of the third functional module 53, the execution environment 100 detects the activation event for executing the fourth functional module 54 that has the first priority 201. As shown in FIG. 11, which shows the processing list at a subsequent fifth point in time, this activation event is subsequently entered in the processing list 140 prior to the activation event, which likewise has the first priority 201, for executing the ninth functional module 59. Consequently, on the application of the LIFO principle, all the functional modules 51, 52, 53, 54 of the first event chain 31 are first executed before the processing of all the further event chains 32, 33 is started, in particular before the processing of the activation event, which likewise has the first priority 201, for executing the ninth functional module 59 is started.

FIG. 12 shows a further event chain 33 of the control program 10. The event chain 33 comprises two initial modules 21 that are activated by two sensor signals 132 provided as initial events 41 by the interface module 130. The initial modules 21 each generate a first activation event 46 and a second activation event 47 that are supplied to both event inputs of a functional module 20 configured as a unification module 23.

The unification module 23 is configured to be executed only on the occurrence of the first and second activation events 46, 47. It generates a subsequent activation event 48 for activating a further functional module 20 that represents the end module 27 of the event chain 33. The programming environment used on the creation of the control program 10 is configured to assign in an automated manner to the subsequent activation event 48 a priority that is defined on the basis of the priorities of the first and second activation events 46, 47 for activating the unification module 23. In this respect, the subsequent activation event 48 is assigned the lowest of the priorities of the first and second activation events 46, 47. For example, if the first activation event 46 has the second priority 202 and the second activation event 47 has the third priority 203, the subsequent activation event 48 is assigned the third priority 203 in an automated manner.

FIG. 13 shows the first part device 310 and the second part device 320 of the programmable logic controller 5 of the machine 1 that are connected to one another by means of the communication link 60 via an intermediate device 307 configured as a router. The part environments 101, 102 of the execution environment 100 executed on the part devices 310, 320 are configured to transmit activation events generated on the first part device 310 for activating functional modules executed on the second part device 320 via the communication link 60 and the interposed intermediate device 307.

The first part device 310 comprises a transmission unit 330 that transmits activation events stored in a transmission queue 332 to the router 307 via the communication link 60 in an order determined by the position of said activation events in the transmission queue 332. In this respect, the part environment 101 of the execution environment 100 executed on the first part device 310 stores the individual activation events in the transmission queue 332 such that a transmission sequence of the individual activation events is determined by their priorities and the activation events are transmitted in order by descending priority. Analogously, the router 307 is configured to forward the individual activation events in order by descending priority to the second part device 320.

The second part device 320 has a reception unit 335 that stores activation events received via the communication link 60 in a reception queue 337. In this respect, the position of the individual activation events in the reception queue 337 is determined by their priority, wherein the individual activation events are stored in order by descending priority in the reception queue 337. The part environment 102 of the execution environment 100 executed on the second part device 320 is configured to process the activation events in order by descending priority in accordance with their position in the reception queue 337.

FIG. 14 shows a method 400 executed by the execution environment 100 for executing the control program 10. The method 400 comprises detecting 410 activation events 40 that have occurred, entering 415 the detected activation events 40 in the processing list 140, executing 420 the respective functional modules 20 associated with the activation events 40 that have occurred in the execution sequence specified by the processing list 140, and transmitting 425 activation events 40 generated on the execution 420 of the functional modules 20 via the communication link 60.

REFERENCE NUMERAL LIST 1 machine
5 programmable logic controller
10 control program
11 first part program
12 second part program
15 first application
16 second application
17 third application
20 functional module
21 initial module
23 unification module
27 first end module
28 second end module
31 first event chain
32 second event chain
33 further event chains
40 activation event
41 initial event
146 first activation event
147 second activation event
48 subsequent activation event
51 first functional module
52 second functional module
53 third functional module
54 fourth functional module
55 fifth functional module
60 external communication link
80 event link
82 data link
84 preceding functional module
85 subsequent functional module
86 event output
87 event input
100 execution environment
101 first part environment
102 second part environment
104 further part environments
120 execution module
130 interface module
131 external input interface
132 input signal
133 external output interface
134 output signal
140 processing list
181 gripper
182 transverse kinematic unit
183 first actuator
184 vertical kinematic unit
185 second actuator
186 conveyor
187 third actuator
188 time-critical sensor
189 sensor
195 workpiece
201 first priority
202 second priority
203 third priority
307 intermediate device
310 first part device
311 first execution resource
312 second execution resource
320 second part device 321 third execution resource
322 fourth execution resource
330 transmission unit
332 transmission queue
335 reception unit
337 reception queue
400 method
410 detecting activation events that have occurred
415 entering in the processing list
420 executing functional modules
425 transmitting

The invention claimed is:

1. A method, implemented by a least one processor, of executing an event-oriented control program on a programmable logic controller of an automation system,
   wherein the control program comprises program instructions that provide a plurality of functional modules,
   wherein an execution of individual functional modules is triggered in an event-controlled manner on the occurrence of activation events that are each associated with the individual functional modules,
   wherein the functional modules of the control program to be successively executed each are configured to generate activation events on their execution, said activation events triggering the execution of the respective functional module of the control program to be executed directly afterwards,
   wherein priorities are assigned to each of the activation events,
   wherein the method comprises:
       detecting activation events that have occurred; and
       executing, in an execution sequence defined on the basis of the priorities of individual activation events, the functional modules that are each associated with the activation events that have occurred.

2. The method in accordance with claim 1,
   wherein the control program has a common functional module whose execution can be triggered by a first and a second activation event,
   wherein different priorities are assigned to the first and second activation events,
   wherein the common functional module is executed with the priority of the first activation event on a triggering by the first activation event and is executed with the priority of the second activation event on a triggering by the second activation event.

3. The method in accordance with claim 1, comprising:
   entering the activation events that have occurred in at least one processing list, taking into account the priorities of the individual activation events.

4. The method in accordance with claim 3,
   wherein activation events of different priorities are entered into different processing lists and the individual processing lists each only comprise activation events of the same priority.

5. The method in accordance with claim 1,
   wherein functional modules triggered by newly detected activation events are executed later than functional modules that are triggered by already previously detected activation events of the same priority.

6. The method in accordance with claim 1,
   wherein functional modules triggered by newly detected activation events are executed earlier than functional modules that are triggered by already previously detected activation events of the same priority.

7. The method in accordance with claim 1,
   wherein the programmable logic controller comprises a first execution resource and a second execution resource connected to the first execution resource via a communication link,
   wherein the control program comprises a first part program executed on the first execution resource and a second part program executed on the second execution resource,
   wherein the method comprises transmitting activation events that have occurred on the first execution resource from the first execution resource to the second execution resource via the communication link,
   wherein the transmission takes place with transmission priorities determined on the basis of the priorities of the individual activation events.

8. The method in accordance with claim 7,
   wherein a transmission sequence with which the individual activation events are transmitted by a transmission unit of the first execution resource via the communication link is defined on the basis of the priorities of the individual activation events.

9. The method in accordance with claim 7,
   wherein a forwarding sequence with which the individual activation events are forwarded on the communication link is defined on the basis of the priorities of the individual activation events.

10. The method in accordance with claim 7,
    wherein an output sequence with which the individual activation events, after their reception via the communication link, are output by a reception unit of the second execution resource for further processing is defined on the basis of the priorities of the individual activation events.

11. The method in accordance with claim 1,
    wherein individual activation events are only assigned their priority at an execution time of the control program, for example, taking into account a parameter value generated at the execution time.

12. The method in accordance with claim 11,
    wherein the activation events of functional modules to be subsequently executed are generated on the execution of previously executed functional modules,
    wherein, on their generation, the activation events of the functional modules to be subsequently executed are assigned the priorities of those activation events that triggered the execution of the respective previously executed functional modules.

13. The method in accordance with claim 1,
    wherein the control program comprises a functional module whose execution is only triggered on the occurrence of a first and at least a second activation event,
    wherein an activation event generated by this functional module is assigned a priority that corresponds to the lowest priority of the activation events triggering the execution of the functional module.

14. The method in accordance with claim 1,
    wherein a plurality of subsequent activation events are generated on the execution of the control program on the basis of a source event.

15. The method in accordance with claim 14,
    wherein the control program comprises an event chain having activation events generated successively on the execution of the control program on the basis of the source event.

16. The method in accordance with claim 14,
wherein a programming environment for creating the control program assigns the same priority in an automated manner to the plurality of subsequent activation events.

17. The method in accordance with claim 16,
wherein the plurality of subsequent activation events comprise a plurality of activation events of the event chain.

18. The method in accordance with claim 14,
wherein the priority assigned to the plurality of activation events can be predefined by a user of the programming environment.

19. The method in accordance with claim 14,
wherein the priorities assigned in an automated manner can be adapted by the user within the programming environment.

20. The method in accordance with claim 1, wherein individual activation events are assigned a predetermined priority, and
wherein the predetermined priority is predefined by a predefined priority of an event output or an event input of a template program instructions forming for a program module used on the creation of the control program.

21. The method in accordance with claim 1, wherein said activation events triggering the execution of the respective functional module of the control program to be executed directly afterwards do so by individual event chains formed via event links.

22. An execution environment for executing an event-oriented control program on a programmable logic controller of an automation system,
wherein the control program comprises program instructions that provide a plurality of functional modules,
wherein the execution environment is configured to trigger an execution of individual functional modules in an event-controlled manner on the occurrence of activation events that are each associated with the individual functional modules,
wherein functional modules of the control program to be successively executed each are configured to generate activation events on their execution, said activation events triggering the execution of the respective functional module of the control program to be executed directly afterwards,
wherein priorities are assigned to each of the activation events,
wherein the execution environment is configured to detect activation events that have occurred and
to execute in an execution sequence defined on the basis of the priorities of individual activation events the functional modules associated with the activation events that have occurred.

23. A device, comprising:
programmable logic controller having a memory module,
wherein an execution environment for executing an event-oriented control program on the programmable logic controller is stored in the memory module,
wherein the control program comprises program instructions that provide a plurality of functional modules,
wherein the execution environment is configured to trigger an execution of individual functional modules in an event-controlled manner on the occurrence of activation events that are each associated with the individual functional modules,
wherein functional modules of the control program to be successively executed each are configured to generate activation events on their execution, said activation events triggering the execution of the respective functional module of the control program to be executed directly afterwards,
wherein priorities are assigned to each of the activation events,
wherein the execution environment is configured:
to detect activation events that have occurred, and
to execute in an execution sequence defined on the basis of the priorities of individual activation events the functional modules associated with the activation events that have occurred.

\* \* \* \* \*